June 6, 1961   R. W. MAZZACANE   2,987,242
RESILIENT FAN GUARD SUPPORT
Filed Oct. 29, 1957   2 Sheets-Sheet 1

Inventor:
Robert W. Mazzacane,
by Lemard J Platt
His Attorney.

United States Patent Office 2,987,242
Patented June 6, 1961

2,987,242
RESILIENT FAN GUARD SUPPORT
Robert W. Mazzacane, Orange, Conn., assignor to General Electric Company, a corporation of New York
Filed Oct. 29, 1957, Ser. No. 693,141
2 Claims. (Cl. 230—259)

My invention relates to electric fans and has as one of its objects to provide an improved resilient fan guard and motor supporting means for absorbing motor and fan vibrations, and reducing the transmission of such vibrations and the attendant noise resulting from such vibrations.

It is another object of my invention to provide an improved low cost resilient mounting means and guard for an electric fan having a minimum number of parts which may be easily manufactured.

In accordance with one aspect of my invention, an electric fan comprising a motor and a fan blade driven by the motor is provided with a guard comprising a plurality of radially extending wires, and a plurality of annular rings for connecting the radial wires to each other. The inner end portion of some of the radial wires are directed axially and attached to the motor. A supporting panel is provided, and the outer ends of other radially extending wires are connected to the panel. By this arrangement, the radial wires and the annular rings provide a very simple, yet effective, vibration absorbing support and guard for an electric fan.

Other objects and attendant advantages of my invention will be apparent from the following description taken in connection with the accompanying drawing in which.

Figure 1:
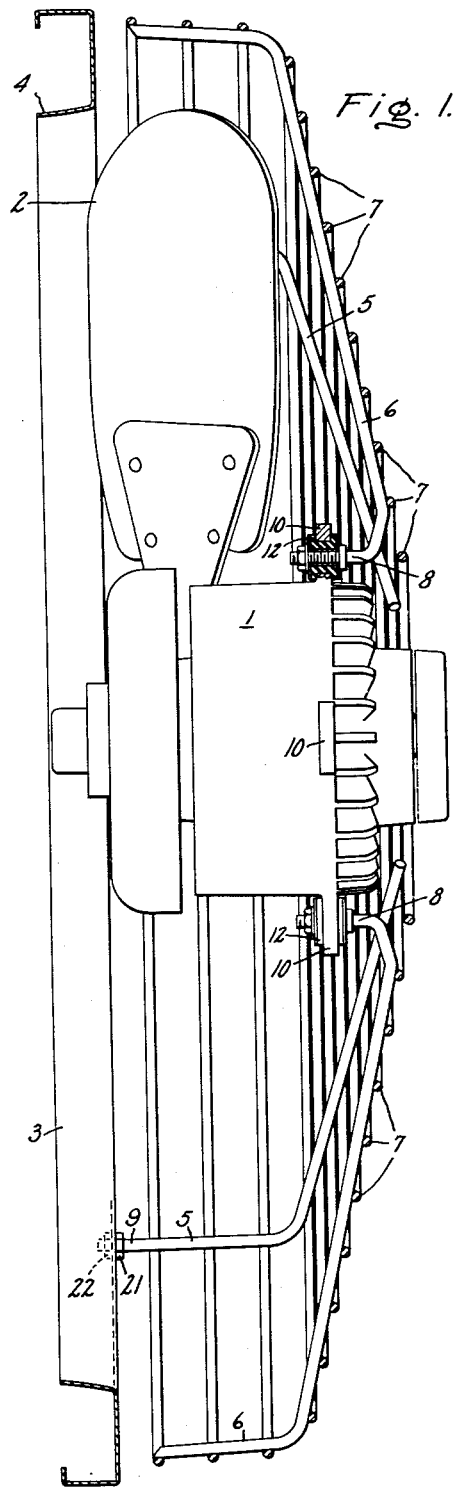
FIG. 1 is a cross-sectional view showing my improved electric fan guard and support.

Referring now to FIG. 1 there is illustrated an electric motor 1 for driving fan blades 2. As shown, blades 2 are suitably located adjacent to an opening 3 formed in a panel 4 for forcing air through the opening. In a conventional manner, panel 4 may be suitably mounted adjacent to a window for ventilating a room.

I provide a unique guard arrangement for functioning as a guard for the fan blades and for uniquely supporting motor 1 on window panel 4. In the arrangement illustrated, the guard consists of a plurality of radial wires 5 and 6 along with the plurality of co-axially arranged annular rings 7 for connecting the radial wires 5 and 6 to each other. Annular rings 7 may be secured to wires 5 and 6 by welding or other suitable means. As shown, the inner end portions 8 of some of the wires 6 are curved and directed axially inwardly toward motor 1 for attachment to the motor. Other radial wires 5 are provided with axially extending outer end portions 9 for attachment to supporting panel 4. Thus, the support for motor 1 extends through radial wires 6, annular rings 7, and radial wires 5 to supporting panel 4. With this arrangement, no single radial wire is directly connected to both the motor and the panel thereby enabling the resiliency of the entire guard to absorb the vibrations of motor 1 and fan blades 2 and effectively prevent the transmission of such vibrations to panel 4.

Figure 2:
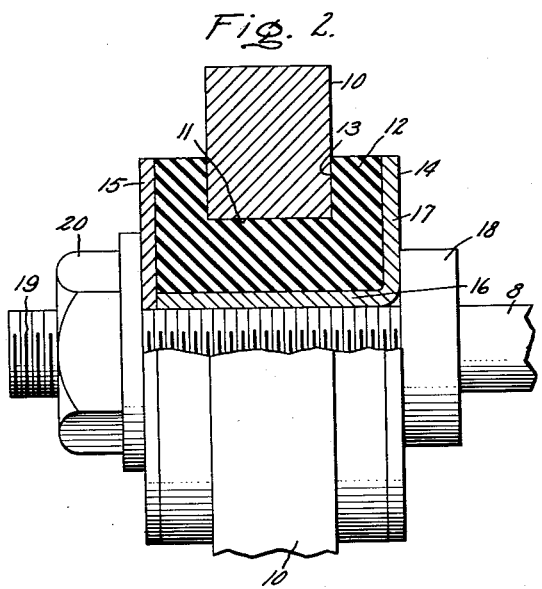
FIG. 2 is an enlarged cross-sectional view showing my improved means for connecting the guard to the motor.
Figure 3:
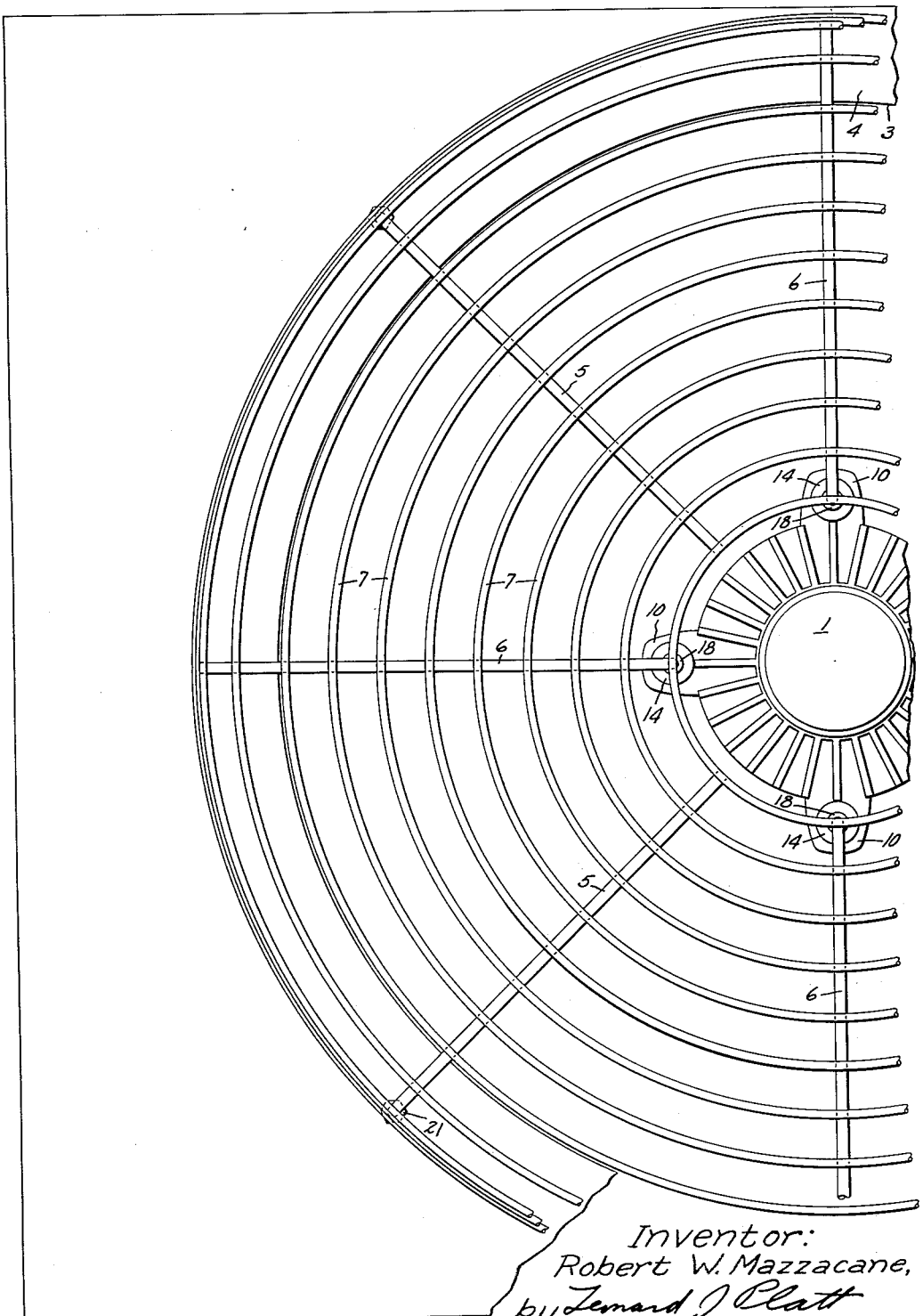
FIG. 3 is a fragmentary front elevational view of my improved fan guard and support.

In order to further reduce the transmission of vibrations from motor 1 to guard 5, 6, 7, and panel 4, an improved easily assembled vibration damping means is provided for connecting motor 1 to radial wires 6 of the guard. As shown more particularly in FIG. 2, a plurality of mounting lugs 10 may be integrally formed with motor 1 and extend radially outwardly therefrom. Lugs 10 may have an axially extending aperture 11 formed therein for receiving a resilient bushing 12 of soft rubber or other vibration damping material. Bushing 12 may be suitably provided with a circumferential recess 13 for receiving the surfaces of lug 10 adjacent to aperture 11, to thereby suitably hold the bushing within aperture 11.

An eyelet 14 and washer 15 are provided for substantially enclosing rubber bushing 12 and for limiting the compression of bushing 12. As shown more particularly in FIG. 2, eyelet 14 comprises a hollow tubular portion 16 and a flange portion 17 extending from one end thereof. Bushing 12 may be suitably apertured to receive the tubular portion 16 of eyelet 14.

A unique means is provided for connecting bushing 12 to radial wires 6. As shown in FIG. 1 the inner axially extending portion 8 of radial wires 6 may be provided with an integrally formed flange 18, and screw threads 19 may be formed on the axially inwardly extending portion of radial wires 8 from flange 18 to the end thereof. Flange 18 abuts against flange 17 of eyelet 14 and a suitable nut 20 may be threaded on threads 19 for abutting washer 15, and rigidly fastening eyelet 14 and washer 15 to axially extending end portions 8 of wires 6. Nut 20 exerts a predetermined compressive force on bushing 12 as determined by the length of tubular portion 16 of eyelet 14. When the nut is tightened, rubber bushing 12 is suitably confined between the radially inwardly directed end portions 8 of radial wires 6 and adjacent portions of mounting lugs 10, thus providing an improved vibration damping connection between guard 5, 6, 7, and motor 1.

The above-described construction for resiliently supporting motor 1 and fan blades 2 facilitates manufacture and assembly. Bushings 12 are first positioned in apertures 11 and then eyelets 14 and threaded portions 19 of wires 6 are passed through the openings formed in the bushings. Then washers 15 and nuts 20 are positioned over screw threads 19 and the nut is tightened to suitably compress bushing 12. After completing the assembly of guard 5, 6, 7, to motor 1, the motor and guard are suitably assembled as a unit to mounting panel 4, for example by an integrally formed flange 21 which may be provided on end portions 9 of radial wires 5 and a nut 22.

It will be seen from the foregoing that motor 1 and fan blades 2 are mounted on fan guard 5, 6, and 7, in a secure and reliable manner. Furthermore, guard 5—6—7 acts both as a means for mounting the fan motor 1 and blades 2, and as a guard for the fan blades, thus permitting elimination of the separate elements which are generally considered necessary to perform these functions. It should be apparent that motor 1 and fan blades 2 are insulated from the guard by vibration damping bushings 12 and that the resiliency of the entire guard functions to adsorb motor vibrations. It is clear that the electric fan of this invention is characterized by its simplicity and ease of assembly and the provision of an improved resilient support for absorbing motor vibrations and reducing the transmission of such vibrations.

While there has been shown and described a particular embodiment of this invention, it will be obvious to those skilled in the art that various other changes and modifications can be made therein without departing from the invention, and therefore, it is aimed in the appended claims to cover all such changes and modifications as fall within the true spirit and scope of the invention.

What I claim as new and desire to secure by Letters Patent of the United States is:

1. An electric fan comprising a motor; a plurality of radially extending wires each having an inner end portion and an outer end portion; a plurality of annular rings connected to said radial wires, the inner end portion of some of said radial wires being directed axially and attached to the motor; a supporting panel; the outer end portion of other radially extending wires being connected to said panel, said radial wires and annular rings resiliently supporting the fan on the panel and forming a guard therefor.

2. An electric fan assembly comprising a support; a motor; a wire fan guard connected to said support and embracing said fan, said guard including a plurality of radially extending wires each having an inner end portion, said inner end portions being directed axially; a flange integrally formed on the axially directed portion of said radial wires; screw threads formed on the axially directed portions of said radial wires, said screw threads extending from said flange to the end of said axially directed portions of the wires, a plurality of mounting lugs extending radially outwardly from said motor, an axially extending aperture formed in each of said lugs; an apertured resilient bushing extending through said axially extending aperture, said axially directed screw threaded portion extending through the aperture in said bushing, and a nut screwed onto the screw threads to resiliently secure said motor to said radial wires whereby said radial wires resiliently support said electric fan.

References Cited in the file of this patent

UNITED STATES PATENTS

| | | |
|---|---|---|
| 1,823,521 | Ackerman et al. | Sept. 15, 1931 |
| 1,824,202 | Finch | Sept. 22, 1931 |
| 1,863,370 | Geyer | June 14, 1932 |
| 2,096,621 | Skolfield | Oct. 19, 1937 |
| 2,115,653 | Snyder | Apr. 26, 1938 |
| 2,258,325 | Hess et al. | Oct. 7, 1941 |
| 2,361,184 | Ellis et al. | Oct. 24, 1944 |
| 2,367,449 | Triplett | Jan. 16, 1945 |
| 2,601,947 | Buttner | July 1, 1952 |
| 2,605,959 | Reisch | Aug. 5, 1952 |
| 2,650,019 | Lautner et al. | Aug. 25, 1953 |
| 2,656,974 | Holstein | Oct. 27, 1953 |
| 2,728,541 | Hansel | Dec. 27, 1955 |